United States Patent
Chang

(10) Patent No.: US 7,667,907 B2
(45) Date of Patent: Feb. 23, 2010

(54) ROTATABLE CAMERA MODULE

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/177,384

(22) Filed: Jul. 22, 2008

(65) Prior Publication Data
US 2009/0161240 A1    Jun. 25, 2009

(30) Foreign Application Priority Data
Dec. 25, 2007    (CN)    ............ 2007 1 0203402

(51) Int. Cl.
G02B 7/02    (2006.01)
(52) U.S. Cl. ..................................... 359/824
(58) Field of Classification Search ........ 359/638, 359/819–824, 829; 396/427, 638
See application file for complete search history.

(56) References Cited
U.S. PATENT DOCUMENTS
6,154,302 A * 11/2000 Yagi et al. ............... 359/198.1
6,323,575 B1 * 11/2001 Devenyi .................. 310/266
2002/0176006 A1 * 11/2002 Miura ................... 348/211.99

* cited by examiner

Primary Examiner—Ricky L Mack
Assistant Examiner—Vipin M Patel
(74) Attorney, Agent, or Firm—Andrew C. Cheng

(57) ABSTRACT

A camera module includes a lens barrel, an image sensor, a holder and a driving member. The lens barrel and the image sensor are received in the holder. At least one magnet is arranged on the outer wall of the holder. The driving member includes a spherical casing, a plurality of induction coils and a control unit. The casing has an opening for entry of the holder. The plurality of induction coils is mounted on the inner wall of the spherical casing. The control unit is received in the spherical casing. The control unit is electrically connected with the induction coils. The control unit is configured for controlling the electric current through the induction coils to form an electromagnetic field, thus a magnetism is generated between the at least magnet and the electromagnetism.

12 Claims, 4 Drawing Sheets

ROTATABLE CAMERA MODULE

BACKGROUND

1. Field of the Invention

The present invention relates to camera modules, and particularly to a rotatable camera module.

2. Description of Related Art

With the rapid development of electronic technology, camera modules have been applied in workplaces, vehicles, and in portable electronic devices (see "Digital Image Indexing Using Secret Sharing Schemes: A Unified Framework For Single-Sensor Consumer Electronics", IEEE Transactions on Consumer Electronics, Vol. 51, No. 3, August 2005).

Often, a camera module includes a holder, a barrel received in the holder and optical elements received in the barrel. The optical elements include optical lenses, an infrared-ray-cut (IR-cut) filter, and others. An image sensor is mounted at the bottom of the holder. The image sensor is optically coupled with the optical lenses.

At present, the camera modules of the digital still cameras and the digital video cameras are most often immovably mounted in the main body of the camera. The shooting angle of the camera modules is limited. Although wide-angle lenses can be applied in the camera module, user demands are only partially met.

What is needed, therefore, is a camera module with a wide shooting angle.

SUMMARY

In an embodiment of the present invention, a camera module includes a lens barrel, an image sensor, a holder and a driving member. At least one lens is received in the lens barrel. The lens barrel and the image sensor are received in the holder. The at least one lens optically couplings with the image sensor. At least one magnet is arranged on the outer wall of the holder. The driving member includes a spherical casing, a plurality of induction coils, and a control unit. The casing has an opening receiving the holder. The plurality of induction coils is mounted on the inner wall of the spherical casing. The control unit is received in the spherical casing. The control unit electrically connects with the induction coils. The control unit is configured for controlling the electric current through the induction coils to form an electromagnetic field, whereby magnetism is generated between the at least one magnet and the electromagnetism.

Advantages and novel features will become more apparent from the following detailed description of the present camera module, when taken in conjunction with the accompanying drawings.

BRIEF DESCRIPTION OF THE DRAWINGS

Many aspects of the present camera module can be better understood with reference to the following drawings. The components in the drawings are not necessarily drawn to scale, the emphasis instead being placed upon clearly illustrating the principles of the present camera module. Moreover, in the drawings, like reference numerals designate corresponding parts throughout the several views.

DETAILED DESCRIPTION OF THE EMBODIMENT

Reference will now be made to the drawings to describe preferred embodiments of the present camera module.

Figure 1:
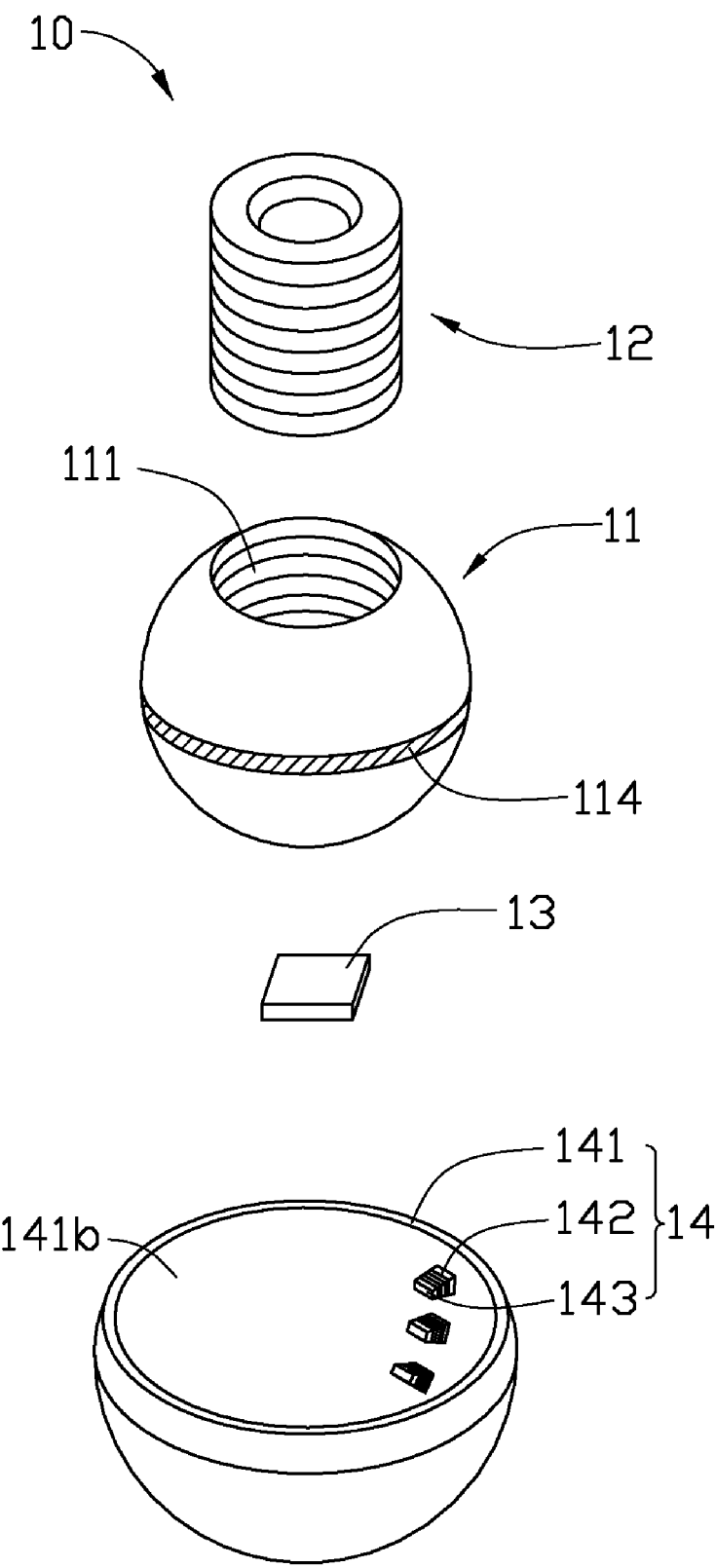
FIG. 1 is an exploded perspective view of a camera module in accordance with a first exemplary embodiment of the present invention.
Figure 2:
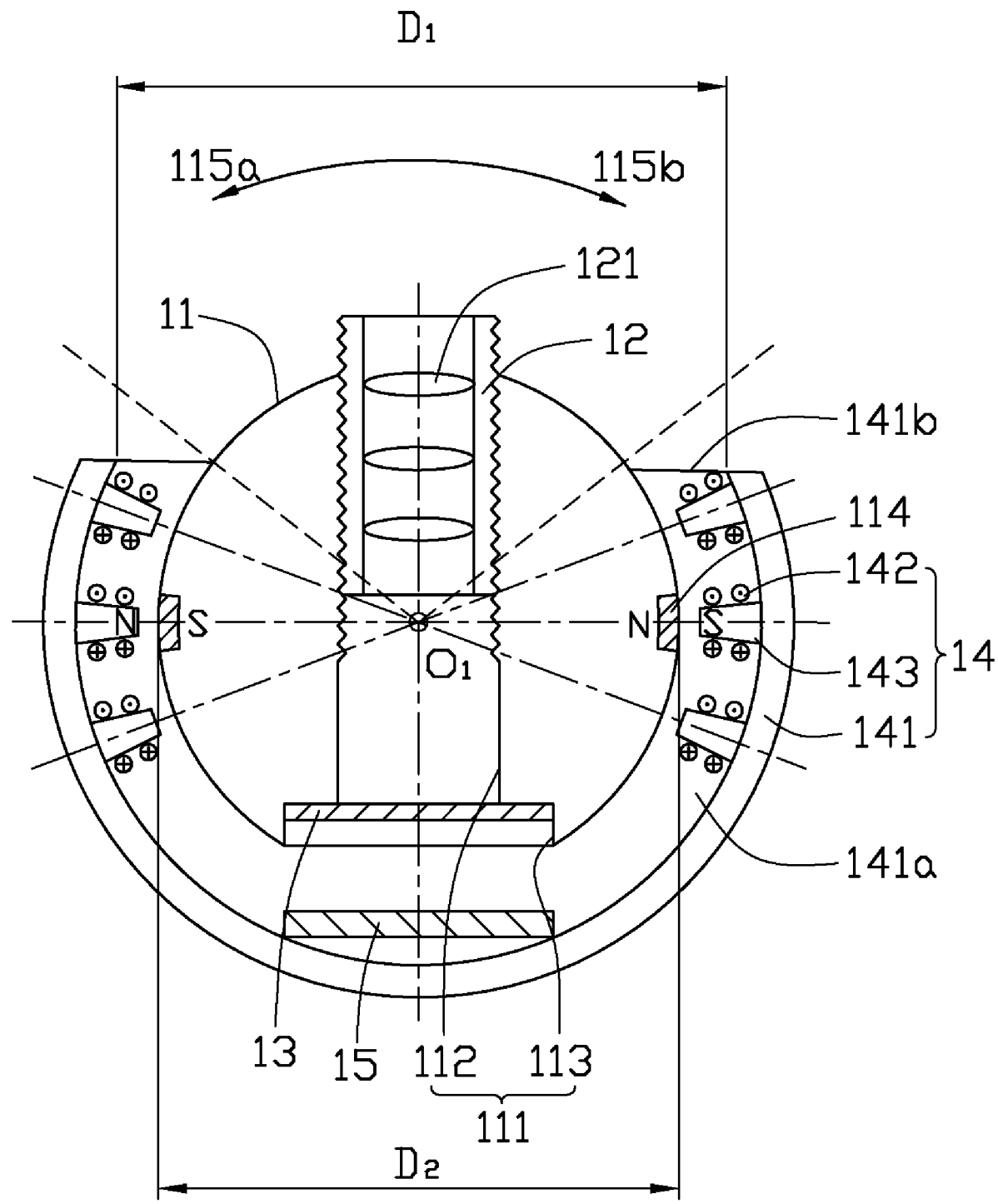
FIG. 2 is a cross-section of the camera module in FIG. 1.

Referring to FIGS. 1 to 2, a camera module 10 is illustrated in accordance with a first present embodiment. The camera module 10 includes a holder 11, a lens barrel 12, optical elements 121 received in the lens barrel 12, an image sensor 13, and a drive member 14.

The holder 11 is configured for holding the lens barrel 12, the optical elements 121, and the image sensor 13 therein. The optical elements 121 include optical lenses, an infrared-ray-cut (IR-cut) filter, etc.

The holder 11 is spherical. A receiving hole 111 is defined in the holder 11. The receiving hole 111 runs through the holder 11 along a principal axis thereof. The receiving hole 111 includes a first receiving portion 112 and a second receiving portion 113. The first receiving portion 112 is contiguous with the second receiving portion 113. The first receiving portion 112 is columnar. The first receiving portion 112 is configured for receiving the lens barrel 12. The inner wall of the first receiving portion 112 has threads defined thereon to mate with the outer wall of the lens barrel 12. Preferably, the inner wall of the first receiving portion 112 is threaded into the outer wall of the lens barrel 112.

The second receiving portion 113 is configured for receiving the image sensor 13. Commonly, the image sensor 13 is square. The second receiving portion 113 has a shape similar to the image sensor 13 so that the image sensor 13 is interferingly fixed therein. The image sensor 13 is optically coupled with the optical elements 121 by the holder 11. The optical elements 121 can be adjusted to move towards or away from the image sensor 13 by rotating the lens barrel 12 relative to the holder 11, allowing adjustment of focal length of the camera module 10.

An annular magnet 114 is fitted/arranged around the outer wall of the holder 11, and is a permanent magnet. The annular magnet 114 has two magnetic poles, north (N) and south (S). The N pole is symmetrically opposite the S pole. Preferably, the center of the annular magnet 114 is substantially coincident with the sphere center of the holder 11.

The image sensor 13 can be a charge coupled device (CCD) or a complementary metal-oxide-semiconductor (CMOS). In the exemplary embodiment, the image sensor 13 is a package chip. The image sensor 13 may be a plastic lead chip carrier (PLCC), ceramic leaded chip carrier, (CLCC) or chip scale package (CSP).

The drive member 14 includes a casing 141 and a plurality of induction coils 142 received therein. The casing 141 is a hollow sphere. In the exemplary embodiment, a plurality of club-shaped elements 143 protrudes from the inner wall of the casing 141. The number of club-shaped elements 143 corresponds to that of the induction coils 142. The club-shaped elements 143 are positioned adjacent to the annular magnet 114. All of the club-shaped elements 143 point at the sphere center of the casing 141. Each club-shaped elements 143 is inserted through one of the induction coils 142. The induction coils 142 each have the capabilities of generating a magnetic force when electric current passes therethrough. The club-shaped elements 143 can be made of a ferromagnetic material or a non-ferromagnetic material such as epoxy resin. Preferably, the club-shaped elements are made of the ferromagnetic material.

The holder 11 is received in the casing 141. A sphere center O1 of the casing 141 is substantially coincident with that of the holder 11. The casing 141 has an opening 141b with a diameter D1 larger than a diameter D2 of the holder 11. The opening 141b is configured for entry of the holder 11.

The camera module 10 further includes a control unit 15. The control unit 15 is mounted in the casing 141. The induction coils 142 are electrically connected to the control unit 15. In use, an electric current will be applied to the induction coil 142. The control unit 15 is configured for controlling the current direction and current intensity of the electric current through the induction coil 142. Thus the induction coil 142 can be a magnet with alterable polarity and changeable magnetic intensity. The like poles repel each other and the unlike poles attract each other. So the magnets formed by the induction coils 142 can be controlled by the control unit 15 to attract or repel the annular magnet 114. Thus the holder 11 can move along a direction 115a-115b as shown in FIG. 2. In the exemplary embodiment, the control unit 15 is a Micro-Processor integrated circuit.

In the present embodiment, the annular magnet 114 and the plurality of induction coil 142 form a rotary motor (not shown). The holder 11 is the rotor of the rotary motor. The drive member 14 is the stator of the rotary motor. The rotor is controlled to rotate by the control unit 15.

In the exemplary embodiment, the control unit 15 is electrically connected with the image sensor 13. The holder 11 is controlled by the control unit 15 to rotate to a position of an image to be captured. The holder 11 can then be rotated to another position to capture another image. In likely manner, a plurality of images is captured. Then the control unit 15 transmits position information of the plurality of images to the image sensor 13. The image sensor 13 synthesizes the plurality of images to a single image according to the position information of the plurality of images. Thus, a camera module capable of capturing wide-angle images is obtained.

Figure 3:
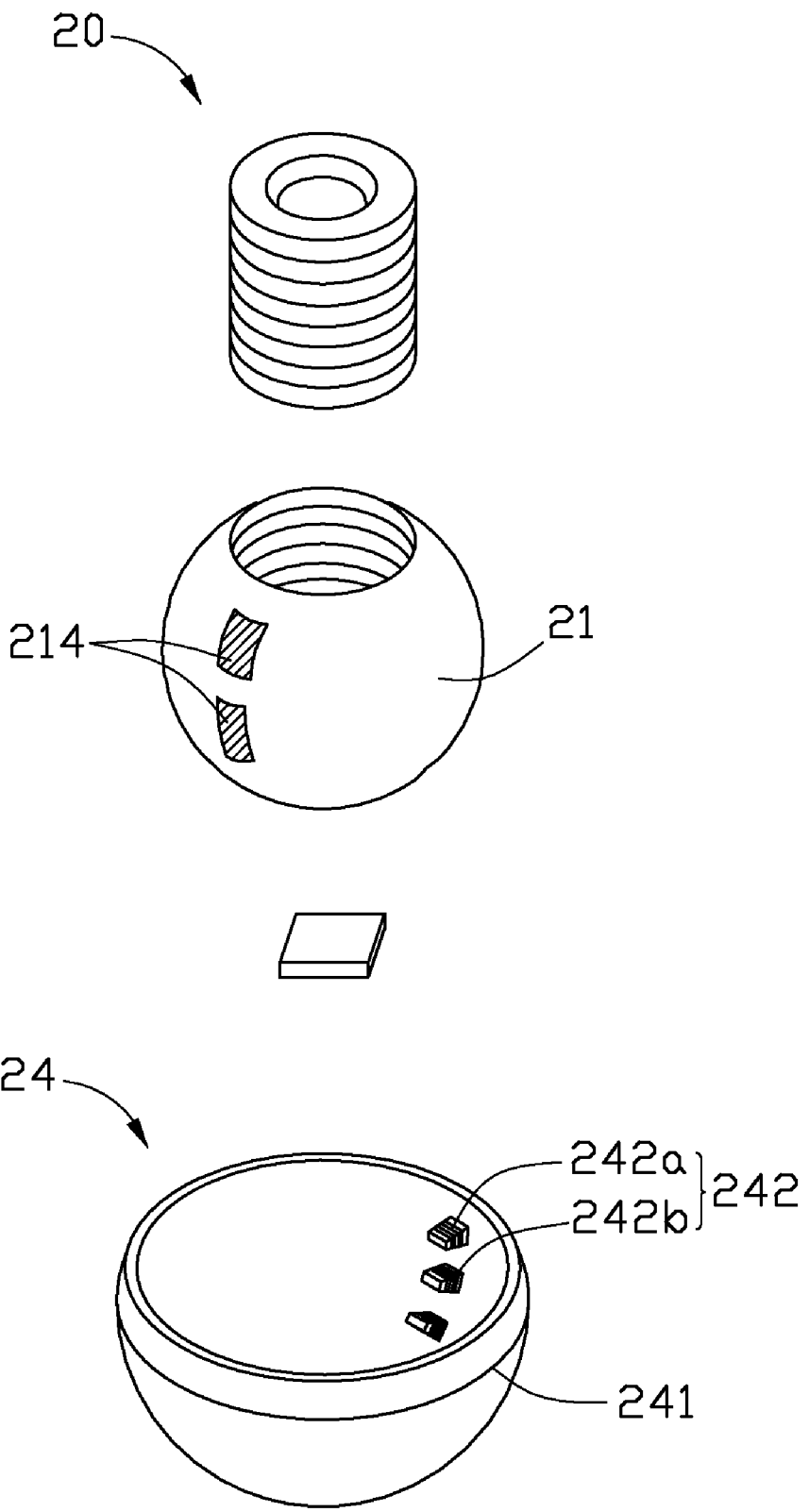
FIG. 3 is an exploded perspective view of another camera module in accordance with a second exemplary embodiment of the present invention.
Figure 4:
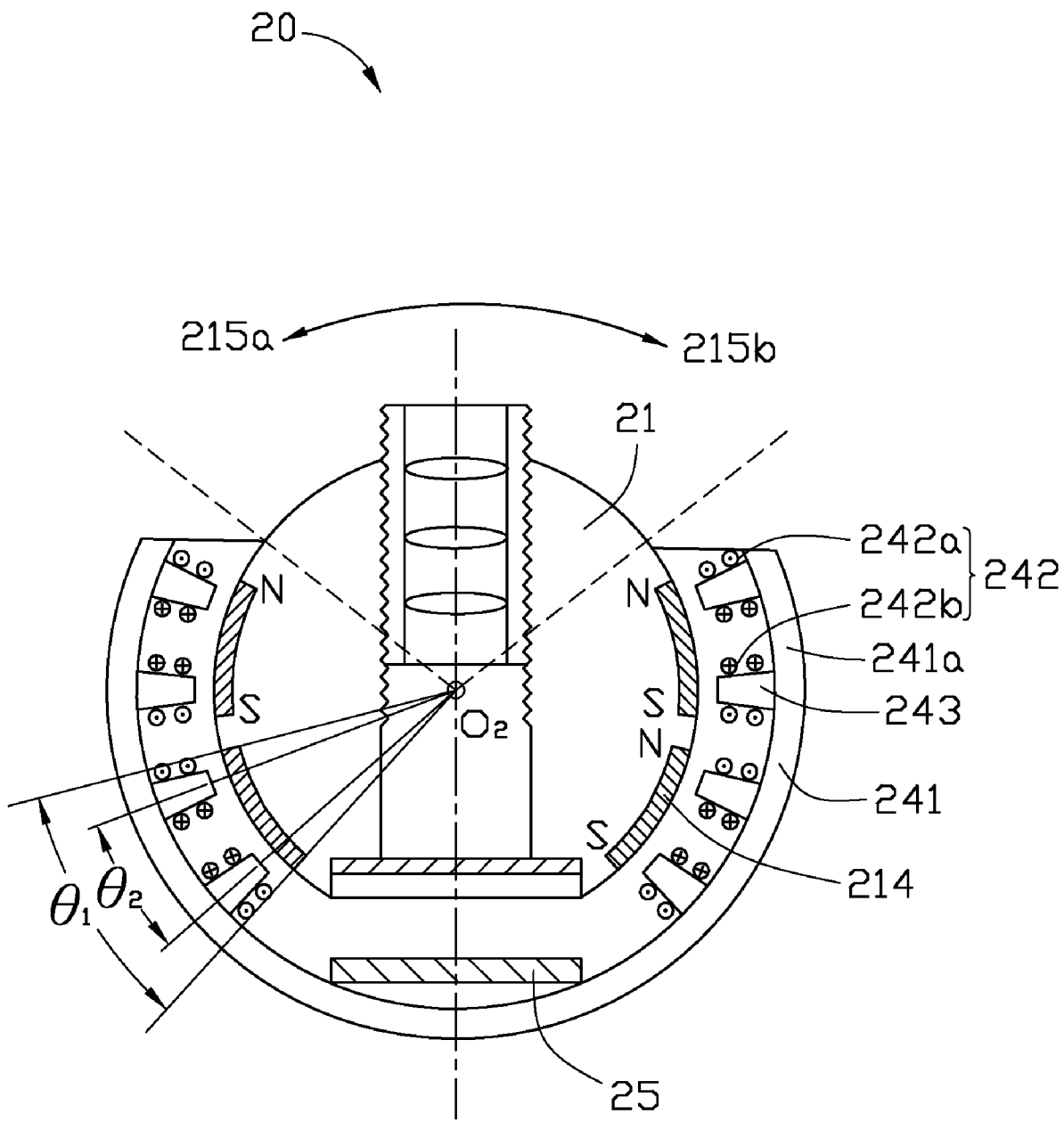
FIG. 4 is a cross-section of the camera module in FIG. 3.

Referring to FIGS. 3 and 4, another camera module 20 is illustrated in accordance with a second exemplary embodiment, differing from the previous embodiment only in that camera module 20 includes at least one curved magnet 214 and a plurality of induction coil couplings 242. Each induction coil coupling 242 includes a first induction coil 242a and a second induction coil 242b. The camera module 20 includes a holder 21, a casing 241 and a control unit 25 in size to the holder 11, the casing 141 and the control unit 15 of the first camera module 10. The induction coil couplings 242, the casing unit 241, and the control unit 25 form a drive unit 24.

The camera module 20 further includes a plurality of club-shaped elements 243 protruding from the inner wall of the casing 241. All of the club-shaped elements 243 point at the sphere center of the casing 241. Each club-shaped elements 243 is inserted through one of the induction coils 242. A casing part 241a belonging to the casing 241 is defined between the first induction coil 242a and the second induction coil 242b. Preferably, the club-shaped elements 243 and the casing unit 241 are both made of a ferromagnetic material. A magnetic coupling is formed when electric currents passes through the first induction coil 242a and the second induction coil 242b. Preferably, the polarity of the first induction coil 242a adjacent to the holder 21 is opposite to that of the second induction coil 242b adjacent to the holder 21.

Curvature of curved magnet 214 equals that of the outer surface of the holder 21. Preferably, the curved magnet 214 is a permanent magnet and is arranged on the outer surface of the holder 21. The curved magnet 214 has two magnetic poles, north (N) and south (S) corresponding to two distal ends of the curved magnet 214. The curved magnet 214 faces the induction coil coupling 242. The two poles of the curved magnet 214 are adjacent to the first induction coil 242a and the second coil 242b.

In the exemplary embodiment, a sphere center O2 of the casing 241 is substantially coincident with that of the holder 21. An angle between two lines connecting the two distal ends with the sphere center of the holder 21 respectively defines θ1. An angle between the principal axes of the first induction coil 242a and the second coil 242b adjacent to each other defines θ2. The angle θ1 exceeds the angle θ2.

The control unit 25 is mounted in the casing 241 for controlling the current intensity and the current direction of the induction coil coupling 242 to change the polarities of the magnetic couplings. Thus the magnets formed by the induction coil couplings 242 can be controlled by the control unit 25 to attract or repel the curved magnet 214, whereby holder 21 can move along a direction 215a-215b as shown in FIG. 4. In the exemplary embodiment, the control unit 25 is a Micro-Processor IC. In operation, the camera module 20 functions as the camera module 10 in the first exemplary embodiment, thus a camera module capable of capturing wide-angle images is obtained.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera module, comprising:
a lens barrel with a lens received therein;
an image sensor for detecting light;
a spherical holder, the lens barrel and the image sensor received therein, the lens optically coupling with the image sensor, and a magnet arranged on the outer wall of the holder; and
a driving member driving the holder to rotate, the driving member comprising:
a spherical casing, the casing having an opening for entry of the holder;
a plurality of induction coils mounted on the inner wall of the spherical casing; and
a control unit received in the spherical casing and electrically connected with the induction coils, configured for controlling the electric current through the induction coils to form an electromagnetic field, such that magnetism is generated between the magnet and the electromagnetic field.

2. The camera module as claimed in claim 1, wherein the sphere center of the casing is substantially coincident with the sphere center of the holder.

3. The camera module as claimed in claim 1, wherein the magnet is a permanent magnet having N and S poles opposite to each other.

4. The camera module as claimed in claim 3, wherein the magnet is an annular magnet fitted around the outer wall the holder.

5. The camera module as claimed in claim 4, wherein the center of the annular magnet is substantially coincident with the sphere center of the holder.

6. The camera module as claimed in claim 3, wherein the magnet is curved, with the N and S poles corresponding to the two distal ends of the curved magnet.

7. The camera module as claimed in claim 6, wherein the plurality of induction coils comprises a plurality of induction coil couplings, each comprising two adjacent induction coils.

8. The camera module as claimed in claim 7, wherein the principal axis of each induction coil passes through the sphere center of the casing.

9. The camera module as claimed in claim 8, wherein an angle between two lines connecting the two distal ends with the sphere center of the holder respectively defines θ1, and an angle between the principal axis of the first induction coil and the principal axis of the adjacent, second coil defined as θ2, wherein angle θ1 is larger than angle θ2.

10. The camera module as claimed in claim 1, further comprising a plurality of club-shaped elements protruding from the inner wall of the casing.

11. The camera module as claimed in claim 10, wherein the club-shaped elements all point at the sphere center of the casing.

12. The camera module as claimed in claim 10, wherein the club-shaped elements are of a ferromagnetic material.

* * * * *